UNITED STATES PATENT OFFICE.

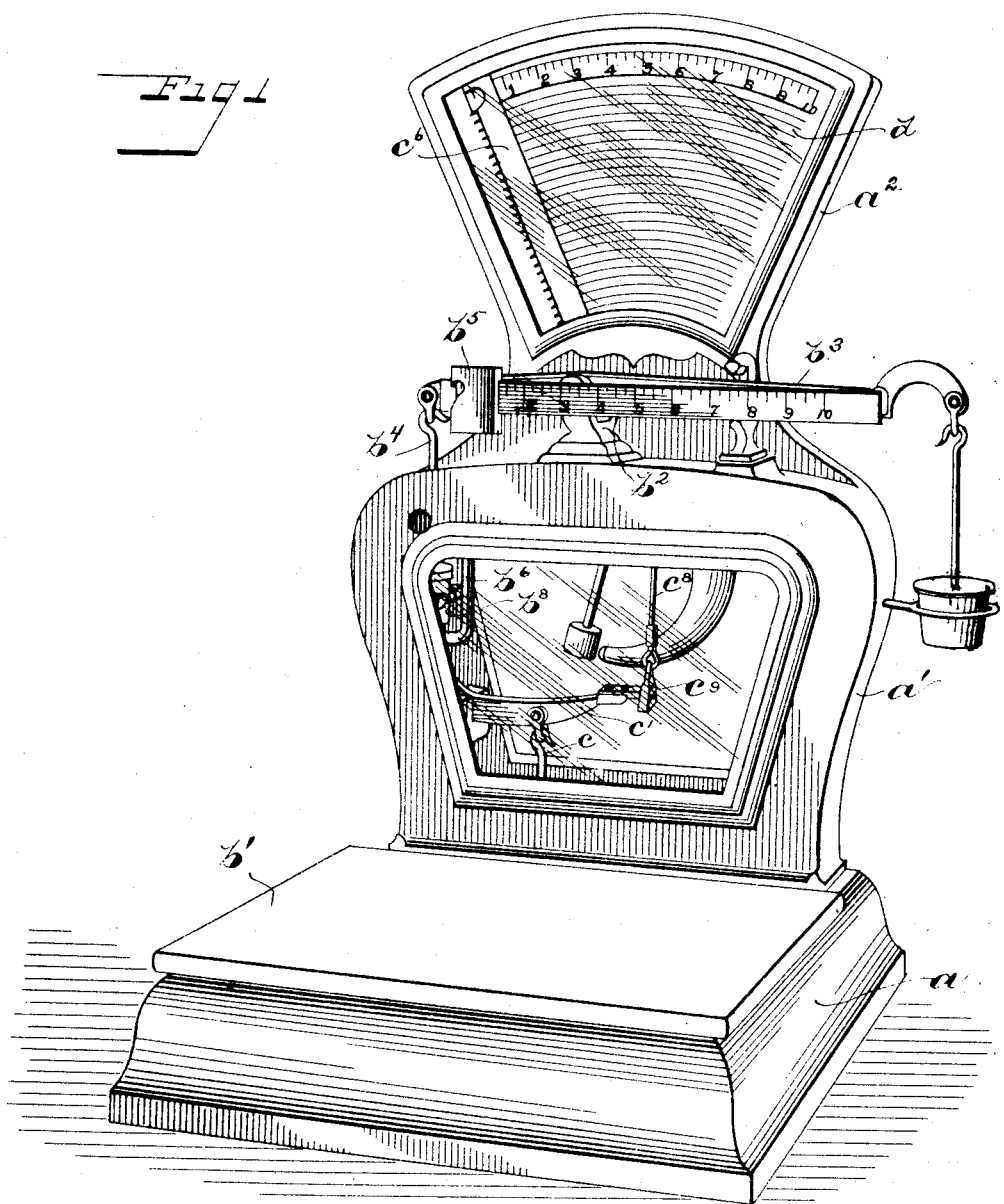

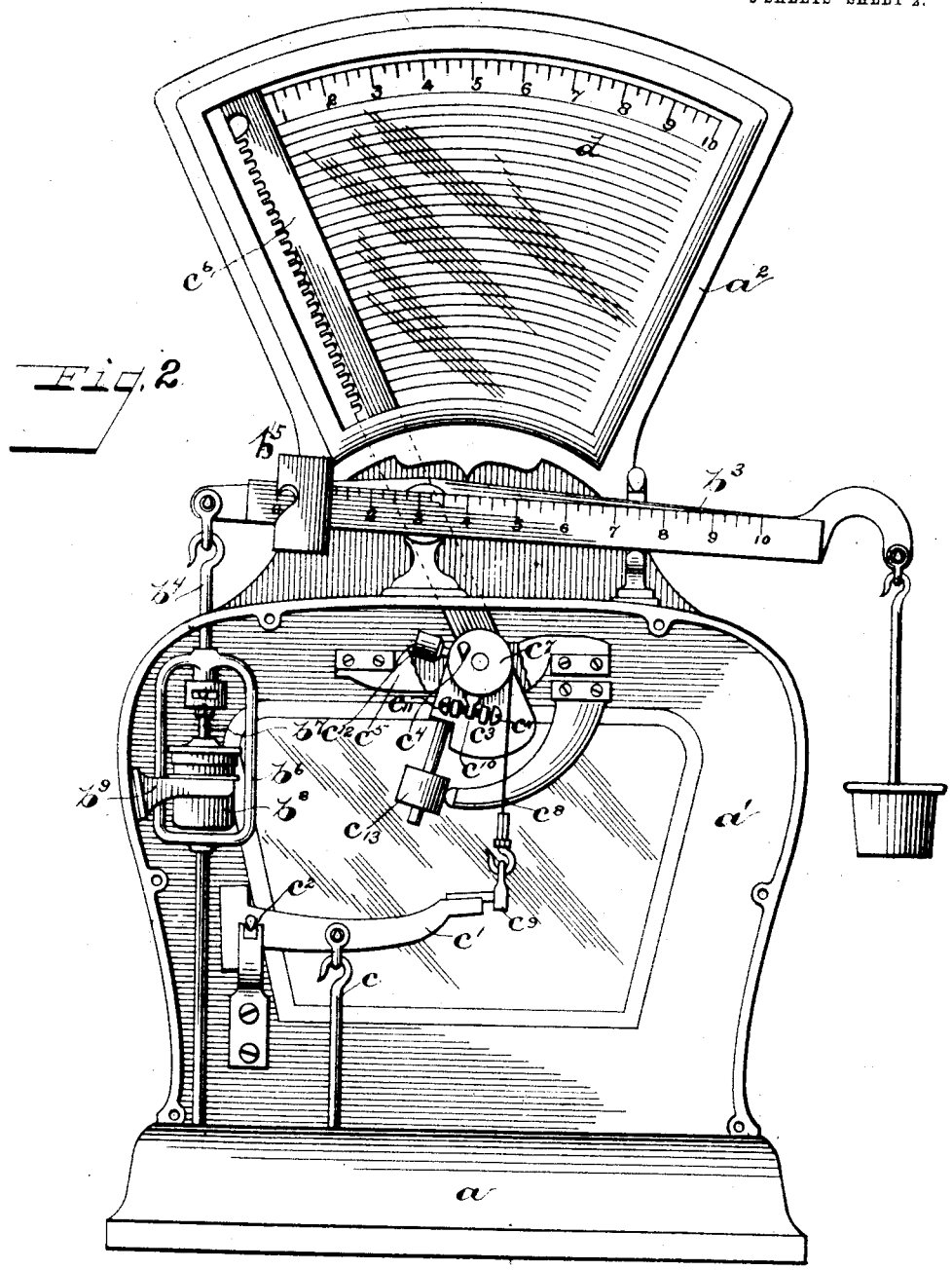

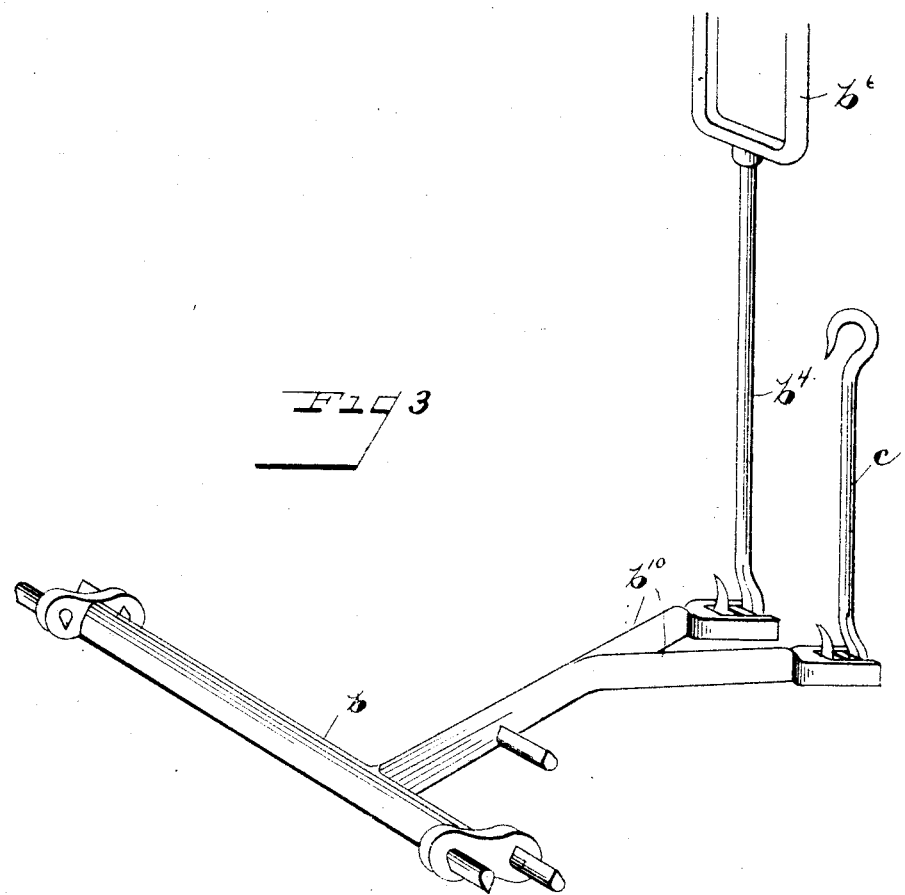

ORANGE O. OZIAS AND JOSEPH HOPKINSON, OF DAYTON, OHIO, ASSIGNORS TO THE COMPUTING SCALE COMPANY, OF DAYTON, OHIO, A CORPORATION OF OHIO.

COMPUTING-SCALE.

No. 867,871.

Specification of Letters Patent.

Patented Oct. 8, 1907.

Application filed June 18, 1906. Serial No. 322,143.

*To all whom it may concern:*

Be it known that we, ORANGE O. OZIAS and JOSEPH HOPKINSON, citizens of the United States, residing at Dayton, in the county of Montgomery and State of Ohio, have invented certain new and useful Improvements in Computing-Scales, of which the following is a specification.

Our invention relates to price scales, and particularly the production of a counter or platform scale having the capacity to quickly and readily indicate the money value of merchandise placed upon the goods-receiver or platform at different prices per unit.

The object of the invention is to provide a scale of the type mentioned with an indicator movable angularly in a vertical plane to indicate both fractional values and fractional weights.

The invention contemplates the employment of a counter-scale of the platform type, comprising a system of levers connected with a weighing beam graduated in pounds and ounces and equipped with a movable poise and additional weights when required, with a price and value indicating mechanism controlled and operated by the movement of the platform levers, and an indicator movable angularly to indicate value at different rates, a differential counter-balancing device being introduced to resist the movement in proportion to the weight of the merchandise being weighed.

The invention consists generally in a platform scale combined with a differential counter-balancing mechanism operating to control an indicator for indicating values when the scale is over-loaded or loaded beyond the point balanced by the weights or poise upon the weighing beam, the indicator and differential counter-balancing mechanism being also adapted to operate independent of the weighing beam and its weights when the same is balanced at zero.

With the above primary and other incidental objects in view, as will appear from the specification, the invention consists in certain novel details of construction and combinations and arrangements of parts, as hereinafter described and set forth in the claims.

Referring to the drawings, Figure 1 is a perspective view of the assembled scale embodying our invention. Fig. 2 is a front elevation of the scale with portions of the main frame and the platform removed. Fig. 3 is a detail view showing one of the platform levers and the connection therewith of the two steelyard hooks hereinafter mentioned.

Referring by letter to the drawings, the main frame comprises a base portion, $a$, an upright frame portion, $a^1$, adjacent to one edge of said base, and a housing, $a^2$, surmounting the frame portion, $a^1$, and containing the value chart and indicator. Within the base portion, $a$, is located a system of levers, one of which is shown at $b$ (Fig. 3) and upon which is supported the goods-receiver or platform, $b^1$. Fulcrumed upon a suitable beam stand, $b^2$, located upon the frame portion, $a^1$, is a weighing beam, $b^3$, connected by a steelyard hook, $b^4$, with the platform beam, $b$. The leverage proportion of the weighing beam, $b^2$, is such that a movable poise, $b^5$, is adapted to counterbalance a considerable weight upon the goods-receiver or platform, $b^1$. The steelyard hook, $b^4$, is divided into an upper and lower portion connected by a turn-buckle, $b^6$, within which is connected a plunger, $b^7$, operating within a dash-pot, $b^8$, supported upon a suitable bracket, $b^9$, within the main frame, $a^1$, to obviate undue vibrations of the weighing beam in a well-known manner.

As thus far described, the structure constitutes a platform scale of ordinary type, in which the counter poise weight, $b^5$, on the weighing beam, $b^3$, is adapted to counterbalance a considerably greater load upon the goods-receiver or platform, $b^1$. In order to make the scale a price scale, an indicator and differential counter-balancing mechanism are introduced as follows: The extremity of the platform lever, $b$, is bifurcated as at $b^9$, and engaging therewith is a second steelyard hook, $c$, which at its upper end engages an intermediate lever, $c^1$, furcrumed at $c^2$ in the frame portion, $a^1$. An indicator carrier or hub, $c^3$, is journaled preferably on knife-edged pivots, $c^4$, in a suitable bracket, $c^5$, in the main frame. To one side of the carrier, $c^3$, is an adjustable counter-weight, $c^{13}$, operating as a pendulum weight to counterbalance the load on the platform of the scale. The indicator arm, $c^6$, projects at an angle from the carrier or hub in position to register with graduations of weight and value indicating figures on a segmental chart, $d$, in the upper portion of the frame or housing, $a^2$. On the front of the indicator carrier or hub is an adjustable eccentric, $c^7$, to which one end of the flexible connection, $c^8$, is attached, the opposite end of said flexible connection supporting a stirrup, $c^9$, in which bears the extremity of the intermediate lever, $c^1$. The eccentric, $c^7$, is adjustably mounted on the carrier or hub in order that its leverage may be adjusted, and it is held in position by the arm, $c^{10}$, engaged by two adjustable screws, $c^{11}$, $c^{11}$, on the carrier or hub, $c^3$.

To counterbalance the eccentric, flexible connection and stirrup the eccentric is provided with an adjustable weight, $c^{12}$. It will be noted that the indicator has a considerable range of movement in the scale illustrated equal to ten pounds, and the differential counterpoise operates to balance the load to the extent indicated by the chart and indicator, this counterbalance being supplemental or additional to the counterbalance of the movable poise, $b^5$, or any additional weights which may be attached to the weighing beam, $b^3$. For all goods within the capacity of the chart and the differential counterbalance, the weighing beam and movable poise need not be used. The connection between the goods-receiver or platform, $b^1$, and indicator, $c^6$, is such that any vertical movement of the platform is transmitted through the steelyard hook, $c$, to the intermediate lever, $c^1$, the movement being multiplied by said lever, $c^1$, and transmitted through the flexible connection, $c^8$, to cause a corresponding oscillatory movement of the indicator, $c^6$, thus indicating upon the segmental chart, $d$, the weight and value characters corresponding to the load sustained by the goods receiver or platform $b^1$, in excess of that sustained by the counterpoise, $b^5$, upon the weighing beam, $b^3$. The total weight sustained by the goods receiver or platform will equal the indicated weight plus the weight sustained by and indicated upon the graduated weighing beam.

It will be readily seen that by the construction described the weighing beam, $b^3$, may be utilized for the purpose of tare; and the counterpoise, $b^5$, shifted thereon to counterbalance the weight of the receptacle previously placed upon the platform, $b^1$, and the weight and value of the commodity subsequently placed within the receptacle will be readily and quickly indicated by the movement of the indicator, $c^6$, and may be read in characters of weight and value from the segmental chart, $d$.

The device may also be utilized for ascertaining weights beyond the capacity of the segmental chart. For instance, if the chart is graduated, as in the drawings, to indicate weight and value to the extent of ten pounds, and it is desired to weigh merchandise of approximately seventeen pounds, the merchandise being placed upon the goods receiver and the counterpoise, $b^5$, being shifted to the extreme point on the weighing beam, which in the drawing is also shown to be graduated, with a capacity of ten pounds, the indicator, $c^6$, will then indicate the weight and value of the difference between the weight sustained by the weighing beam and the merchandise, which in this case would be substantially seven pounds. The value of the commodity in tens of units is readily computed by mental process to which is added the value of the remainder as indicated upon the segmental chart, which will give the value of the bulk of merchandise upon the goods-receiver.

From the above description, it is apparent that there has been produced a weighing scale possessing many features of advantage, and which obviously is susceptible of modification in its form, proportion, detail construction and arrangement of parts, without departing from the principle involved or sacrificing any of its advantages.

Having thus described my invention, I claim:

1. In a scale, the combination of a bifurcated platform lever, a weighing beam and an intermediate lever parallel with the platform lever, each connected to the ends of the platform lever, an indicator and an eccentric connected therewith, flexible connection between the intermediate lever and said eccentric, the connecting part connecting said intermediate lever and flexible connection being located in substantially the same plane, substantially as specified.

2. In a scale, the combination of a bifurcated platform lever, a weighing beam connected with one and an intermediate lever connected with the other of the bifurcations, an eccentric and indicator located near the center of the machine, a flexible connection between the free end of the intermediate lever and the eccentric, the end of said intermediate lever being in alinement with the eccentric, substantially as specified.

3. In a scale, a platform lever, a goods-receiver, a weighing beam connected to said platform lever, an intermediate lever also connected to said platform lever, a differential counter-balancing mechanism, connections between said counter-balancing mechanism and said intermediate lever, a dash-pot, a plunger therein, an intermediate connecting device extending from the plunger to the weighing beam, a connecting device extending from said plunger to the platform lever, a part of said last-mentioned connecting device encircling the dash-pot, substantially as specified.

4. In a scale, a platform lever, a goods-receiver, a weighing beam employing a counterpoise, a differential counter-balancing indicator pivotally supported independent of the weighing beam, operating connections between said indicator and platform lever, an offset connecting rod between the platform lever and weighing beam, and a dash pot within the offset portion, and the plunger of said dash pot being substantially in alinement with the points of attachment of said connecting rod, substantially as specified.

5. In a scale, a platform lever, a goods-receiver, a differential counter-balancing mechanism connected to said platform lever, a stationarily supported dash-pot, including a plunger, a connection from the plunger to the platform lever, a part of said connection encircling the dash-pot, and the plunger being in substantial alinement with the lower part of said connecting device, substantially as specified.

6. In a scale, a main frame, a weighing beam, platform levers pivoted thereto, and a pivoted indicator having a pendulum counter-weight connected to said platform lever, a dash pot support on said main frame and connected to said platform lever, a dash pot in said support, and a plunger for said dash pot connected to said platform levers, said connection being offset to bring said plunger in substantial alinement with the connections between said platform lever and said weighing beam, substantially as specified.

In testimony whereof, we have hereunto set our hand this 14 day of June A. D. 1906.

ORANGE O. OZIAS.
JOSEPH HOPKINSON.

Witnesses:
H. M. WALSH,
PAUL A. STALEY.